US011461523B1

(12) United States Patent
Chen et al.

(10) Patent No.: US 11,461,523 B1
(45) Date of Patent: Oct. 4, 2022

(54) GLITCH ANALYSIS AND GLITCH POWER ESTIMATION SYSTEM

(71) Applicant: Synopsys, Inc., Mountain View, CA (US)

(72) Inventors: Chia-Tung Chen, Campbell, CA (US); Che-Hua Shih, Zhubei (TW); Shih-Ting Liu, Hsinchu (TW); Chia-Chih Yen, Taipei (TW); Chun Chan, Cupertino, CA (US); Gung-Yu Pan, Hsinchu (TW); Yi-An Chen, Keelung (TW)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/169,375

(22) Filed: Feb. 5, 2021

Related U.S. Application Data

(60) Provisional application No. 62/972,851, filed on Feb. 11, 2020, provisional application No. 62/971,819, filed on Feb. 7, 2020.

(51) Int. Cl.
*G06F 30/3312* (2020.01)
*G06F 119/12* (2020.01)
*G06F 119/06* (2020.01)

(52) U.S. Cl.
CPC ...... *G06F 30/3312* (2020.01); *G06F 2119/06* (2020.01); *G06F 2119/12* (2020.01)

(58) Field of Classification Search
USPC ........................................................ 716/109
See application file for complete search history.

(56) References Cited

U.S. PATENT DOCUMENTS

| | | | | |
|---|---|---|---|---|
| 2002/0152060 A1* | 10/2002 | Tseng | .................... | G06F 30/331 703/17 |
| 2003/0144828 A1* | 7/2003 | Lin | ........................ | G06F 30/331 703/21 |
| 2003/0182098 A1* | 9/2003 | Ehrler | ..................... | G06F 30/33 703/19 |
| 2005/0189976 A1* | 9/2005 | Muthalif | ................. | G06F 30/33 327/175 |
| 2005/0257185 A1* | 11/2005 | Querbach | ............. | G06F 30/367 716/108 |
| 2015/0331981 A1* | 11/2015 | Mulvaney | ............. | G06F 30/394 716/134 |

* cited by examiner

*Primary Examiner* — Mohammed Alam
(74) *Attorney, Agent, or Firm* — Nicholson De Vos Webster & Elliott LLP; Judith Szepesi

(57) ABSTRACT

A method for performing glitch power analysis of a circuit, comprising receiving no-timing waveform simulation data for the circuit, the waveform simulation data including a first signal, and identifying a delayed stimulus injection point (DSIP) for the first signal. The method further comprises determining a total delay for the first signal and performing waveform replay simulation including injecting the first signal at the DSIP at a time based on the total delay for the first signal.

21 Claims, 14 Drawing Sheets

US 11,461,523 B1

GLITCH ANALYSIS AND GLITCH POWER ESTIMATION SYSTEM

RELATED APPLICATIONS

The present application claims priority to U.S. Provisional Application No. 62/972,851, filed on Feb. 11, 2020, and U.S. Provisional Application No. 62/971,819, filed on Feb. 7, 2020, and incorporates both applications by reference.

TECHNICAL FIELD

The present disclosure relates to an electronic design automation (EDA) system for providing integrated circuit (IC) design, and more particularly to glitch analysis and glitch power estimation.

BACKGROUND

Due to the complexity of new IC devices, EDA systems are now considered essential in the process of converting each new electronic system idea into a corresponding integrated circuit (IC) device using one or more IC "chips". These systems utilize information supplied by a designer, information which is transformed to create an article of manufacture, such as an integrated circuit. When the design is finalized, it is taped-out which typically is when artwork (e.g., geometric patterns) for the integrated circuit is sent to a fabrication facility to manufacture the mask set, which is then used to manufacture the integrated circuit. After tape-out, a semiconductor die is manufactured and packaging and assembly processes are performed to produce the finished integrated circuit.

IC designers utilize EDA systems to develop an initial circuit design (i.e., software-based description of an IC device) that they believe is capable of implementing a new electronic system idea, to analyze and modify the initial circuit design in order to verify that the final design performs the operational objectives set for the electronic system idea, and then to generate and check a series of IC layouts (aka mask designs or mask layouts) that define a physical IC chip capable of implementing the final circuit design.

Many EDA systems include sub-systems that generate power consumption estimations, which are used to optimize the power consumption characteristics of the pre-silicon circuit designs. Digital simulator tools utilized to perform pre-silicon power consumption estimation were developed for IC devices fabricated using complementary metal oxide semiconductor (CMOS) and other fabrication technologies, where the amount of power consumed by glitches accounted for a very small percentage of total power consumption.

A glitch" may refer to undesired transitions (signal pulses of short duration) that occur before a signal settles to its intended voltage level. Glitches can result from a fault or design error, or from the fact that not all signals that are part of a design feature will change value at the same time. Glitches can occur in the presence of a race condition in a digital logic circuit. Each glitch consumes power (referred to as "glitch power") in physical IC devices in the same way valid data signal pulses consume power.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
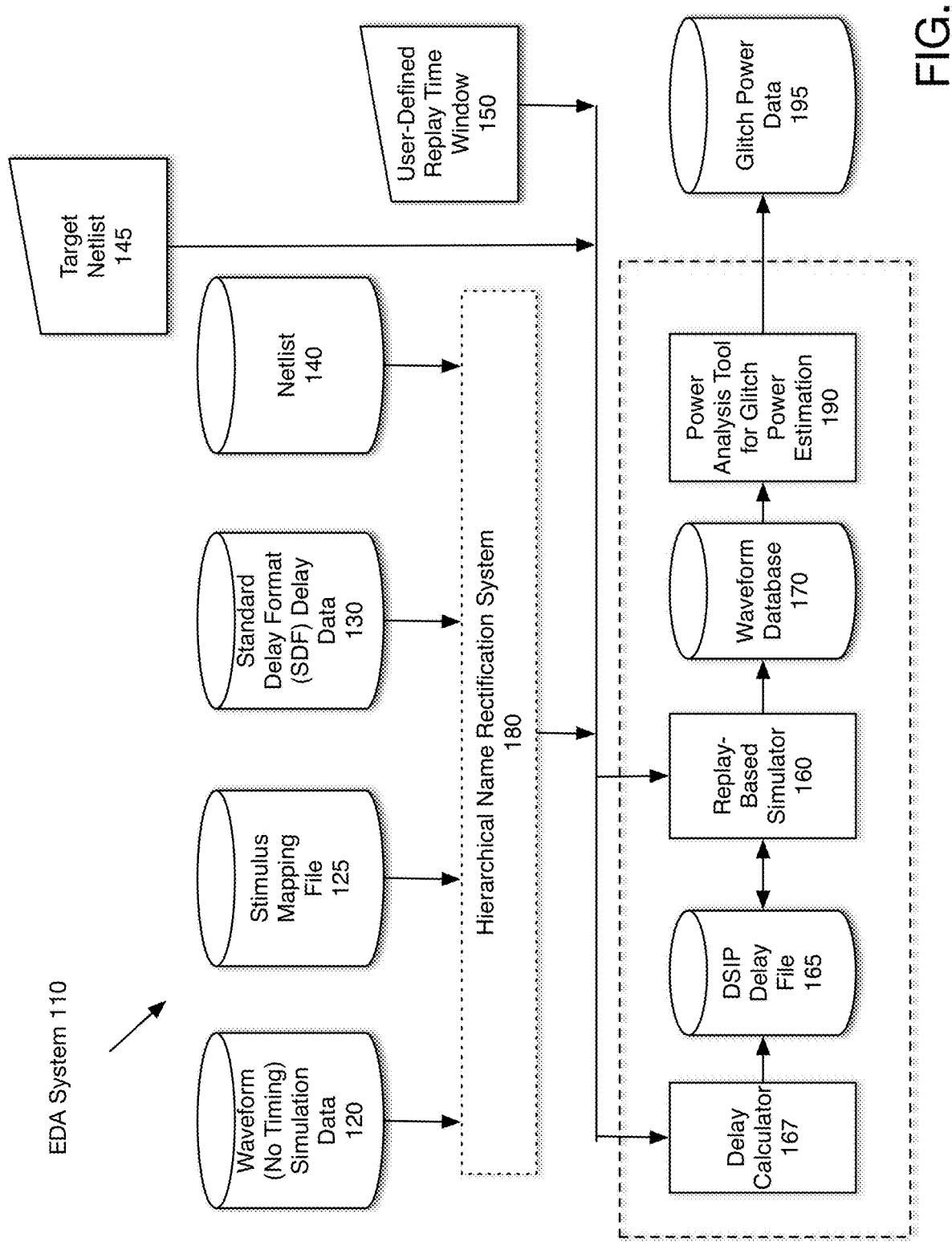
FIG. 1 is a block diagram of one embodiment of the system including the simulation tools.

Aspects of the present disclosure relate to a glitch analysis and glitch power estimation system. The present disclosure is directed to a method and/or process for performing glitch detection and associated power analysis of circuit designs that provides glitch power consumption estimates comparable to those generated by other gate level simulation/standard delay format (GLS/SDF) approaches, but in less time and without the restrictions and potential errors associated with GLS/SDF approaches. In one embodiment, an EDA system that is configured to implement a replay-based power analysis method utilizes no-timing simulation (e.g., Register-Transistor Level (RTL) simulation or gate level simulation) tools and SDF delay data (path/interconnect delay and cell delay data that is automatically generated by an EDA tool during the development of each circuit design). Replay, as used herein, means that the system takes a pre-existing signal waveform and "replays" it with delayed injection of signals at delayed signal injection points (DSIPs) to re-simulate a portion of the circuit design— which may be less than the full execution cycle and/or less than the full circuit design—to identify power glitches. The replay-based power analysis method is performed after a source (no-timing simulation) waveform data is generated by performing a replay of the no-timing (e.g., RTL or gate level) simulation process on a user-designated portion of the target circuit design's netlist description. This system provides early power analysis for gate level design with RTL simulation data. Without this system, accurate power analysis for gate level design happens too late in the traditional design flow to allow for design changes if power targets are missed.

In one embodiment, the present system also addresses signal name mismatching, which is a common and serious problem in IC design and verification, especially in complex flows involving various tools, mixed HDL languages, and representation levels. Compared with rule-base heuristics, the present ML-based approach provides general and accurate rectification results. A framework and methods to transform the hierarchical name rectification problem using machine learning technology is described. In one embodiment, similarity learning and search are used. Specifically, in one embodiment, a network architecture and corresponding methods to train the network using similarity learning are disclosed.

The figures and the following detailed description signify innovations, embodiments and/or examples by way of illustration only, with various features, structures or characteristics described together in a single embodiment to streamline the disclosure. Variations of any of the elements, processes, machines, systems, manufactures or compositions disclosed by such innovations, embodiments and/or examples will be readily recognized and may be used in commerce without departing from the principles of what is claimed.

The figures and detailed description may also signify, implicitly or explicitly, advantages and improvements of a subset of the example embodiments described herein. In the figures and detailed description, numerous specific details may be described to provide a thorough understanding of one or more of the example embodiments. In the interest of not obscuring the presentation of embodiments of the claimed inventions, in the following detailed description, some processing steps or operations that are known in the art may have been combined together for presentation and for illustration purposes and in some instances may have not been described in detail. However, a person skilled in the art will recognize that these embodiments may be used in commerce without these specific details or with equivalents thereof. In other instances, well-known processes and devices are not described in detail as not to unnecessarily obscure aspects of these embodiments. In other instances, some processing steps or operations that are known in the art may not be described at all. The following description is instead focused on the distinctive features or elements of various embodiments of the claimed disclosure. Furthermore, while this description may refer to some components of the structure in the singular tense, more than one component may be depicted throughout the figures and like components are labeled with like numerals.

Overly simplified glitch modeling techniques allow a user to entirely filter out glitches that occur during power simulation, or to entirely propagate glitches that occur during power simulation. In practical applications, a circuit design typically includes two types of glitches: very short duration non-propagating glitches that are effectively canceled immediately after their generation, and longer duration "functional" glitches that propagate along the circuit paths like regular signal transitions. Because the practice of filtering out all glitches entirely cancels both non-propagating and functional glitches, this approach produces too-low toggle counts that generate optimistic power consumption estimates, which in turn can result in physical IC devices that do not meet targeted power consumption constraints. Conversely, propagating both non-propagating and functional glitches produces too-high toggle counts that generate pessimistic power consumption estimates, which increase total manufacturing costs by way of unnecessary over-design and produce release schedule delays.

In addition to detecting total glitch power consumption, power integrity is another power analysis issue that is increasingly affected by glitches in modern FinFET IC devices. Power integrity (PI) analysis includes verifying that each power supply in a circuit design maintains its required voltage level during peak load periods. Due to the increased percentage of the total power consumption attributed to glitches in modern FinFET IC devices, the combined glitch power consumed by several simultaneously occurring glitches can generate a critical power consumption surge period when the simultaneous glitches occur in several different cells powered by a single voltage source.

Presently, one of the methods for accurately predicting glitch generation involves performing gate level simulations (GLSs) using Standard Delay Format (SDF) data. SDF is an IEEE standard format for representing and interpreting timing data for a circuit design (e.g., SDF data for a given cell/device provides predicted delays between the cell's input and output nodes). GLS/SDF simulations involve simulating the operation of a target circuit design's gate level description using SDF data to define, for example, path delays, cell/device delays, interconnect delays and port delays.

Although such GLS/SDF simulations can provide glitch generation predictions, this approach for detecting glitches and glitch power presents several problems. GLS/SDF simulations are very runtime/memory intensive compared with non-timing-related simulations (e.g., static RTL simulations or gate level simulations). In addition, GLS/SDF simulations require other input data files (e.g., RTL test bench, library Verilog model, etc.) that are not readily available during earlier stages in the circuit design process. Thus, GLS/SDF simulations cannot be performed until late in a circuit design's development process. Moreover, GLS/SDF simulations are typically performed using special tools, and the output of GLS/SDF simulation (e.g., gate level FSDB/VCD data) must then be fed to yet another analysis tool to perform power analysis, which makes SDF-based glitch power analysis very runtime intensive and error prone, because the need to use different tools greatly increases the chance of environment mismatch software failures, which greatly increase overall processing time.

FIG. 1 is a simplified block diagram showing an EDA software system 110 including a waveform replay simulation sub-tool/process according to one embodiment of the present disclosure.

The replay-based simulator 160 receives as input data from associated databases or data files generated during the development of a circuit design using the tool 110. The data includes, in one embodiment, waveform (no-timing) simulation data 120, stimulus mapping file(s) 125, SDF data 130, netlist data 140 and user-defined replay time window data 150.

In one embodiment, an electronic design automation (EDA) system 110 is configured to implement a replay-based power analysis system. The system utilizes no-timing simulation, such as those provided by register-transistor level (RTL) simulation or gate level simulation tools. The data generated by the simulator in one embodiment is waveform simulation data 120. The system further uses SDF delay data 130, in one embodiment. The SDF delay data 130 includes path/interconnect delay and cell delay data. In one embodiment, this data is automatically generated by an EDA system during the development of each circuit design.

In one embodiment, the waveform simulation data 120 is generated by performing a no-timing (e.g., RTL or gate level) simulation on a user-designated portion of the target circuit design's netlist description. The netlist data 140 is an input to the system.

A stimulus mapping file 125 includes sets of selected stimulus injection points (SIPs) from the target circuit design's netlist. The stimulus mapping file 125 is generated by reading and processing the source waveform data from waveform simulation data 120, and defines a set of SIPs with their mapped stimulus sources from the waveform simulation data 120.

The user defined replay time window 150 allows definition of the timeframe of the replay simulation. In one embodiment, the target netlist 145 may also be defined for the simulation. In one embodiment, the time window 150 and target netlist 145 may be the entire simulation cycle or a portion of it, and the entire circuit or a portion of the circuit. The ability to perform glitch analysis on a portion of a netlist, or a portion of the simulation cycle, rather than the entire circuit, enables a significant reduction in complexity, and thus time and resources. Thus, this improved simulation system directly impacts the functioning of the simulation computer system by reducing complexity and power consumption.

The replay-based power analysis system calculates glitch power consumption. The replay-based simulator 160 determines the propagation of stimulus signals along delay paths, and detects the glitches generated during the process. By utilizing the SDF data 130 to replicate signal delays during the waveform replay simulation, the waveform replay simulation process substantially replicates the accurate glitch detection without requiring the use of GLS/SDF simulations.

In one embodiment, the delayed SIP (DSIP delay) is generated by delay calculator 167, and stored in DSIP delay file 165. The waveform replay simulation results are stored in waveform database 170, in one embodiment. The replay simulation results are then used to perform glitch detection and associated power analysis of the circuit design by power analysis tool 190 with an accuracy that is comparable to that provided by other GLS/SDF simulations. The output of the replay-based power analysis system is the glitch power data 195 for the target netlist. In one embodiment the power data 195 is stored in memory. The use of the replay-based power analysis system makes simulation with timing delay more flexible. Replay simulation can proceed at any target netlist and/or replay time window specified by the user. Thus, the replay-based power analysis system reduces the time needed for simulation netlist with SDF delays.

Since the input data (120, 125, 130, and 140) to the system 110 are from different sources, the signal names may have developed mismatches during conversion or optimization. Waveform simulation data 120 is based on RTL or gate level simulation, while stimulus mapping data 125 is based on netlist data, for example. This can cause inaccuracy in the power estimation system due to signal mismatch. To resolve this issue, in one embodiment the EDA system 110 further includes a hierarchical name rectification system 180 that ensures that there is no mismatch in the hierarchical names between different data sets, different IC design stages, and different EDA tools. In one embodiment, the hierarchical name rectification system 180 resolves name mismatches using a similarity search system that searches the design tree for the most similar hierarchical name. In one embodiment, the hierarchical name rectification system 180 may be used for a subset of the signals, may be bypassed, or may be eliminated from the system.

Figure 2:
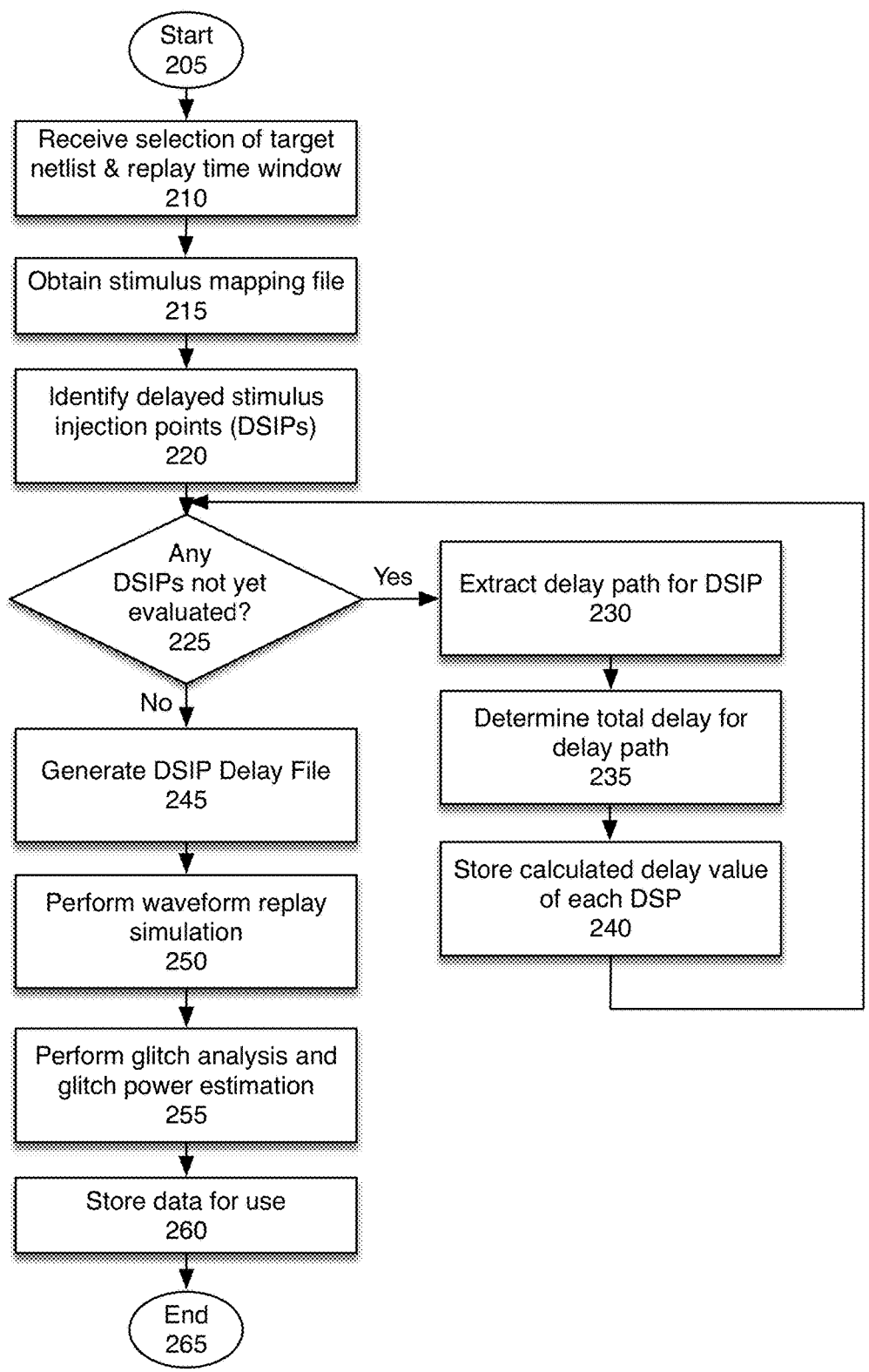
FIG. 2 is a flowchart of one embodiment of utilizing the glitch analysis and glitch power estimation tool.

FIG. 2 illustrates one embodiment of the process used by the replay-based power analyzer. The process starts at 205. In one embodiment, the process starts after the EDA tool performs the initial RTL simulation.

At 210, the selection of the target netlist and replay time window is received. In one embodiment, the user may select the portion of the netlist for evaluation and relevant time window. In another embodiment, the system may automatically select the target netlist and replay time window, or receive such data from an external system.

At 215, the stimulus mapping file is obtained. The stimulus mapping file defines sets of stimulus injection points (SIPs) from the target circuit design's netlist description and their mapped stimulus sources from the source waveform (no timing) simulation data. In one embodiment, the process generates the stimulus mapping file. In one embodiment, the mapping file is generated by a synthesis tool, Gate/RTL correlation system and the process reads the stimulus mapping file generated by that system. In one embodiment, RTL and gate mapping data may be post-processed to generate the mapping file.

At 220, the process identifies the delayed stimulus injection points (DSIPs). The process identifies DSIPs from the stimulus mapping file including all the SIPs for the target circuit design. DSIPs are points where stimulus is injected with a timing delay. DSIPs are a subset of the SIPs, and in one embodiment the process identifies DSIPs by locating all flip-flop output signals from the stimulus mapping file.

At 225, the process determines whether any identified DSIPs have not yet been evaluated to calculate their delay value. If one or more identified DSIPs do not have a calculated delay, the process continues to 230. If the identified DSIPs have been evaluated, the process continues to 245.

At 230, the process extracts the delay path for the DSIP to calculate the accurate delay value of a DSIP. In one embodiment, the delay path is extracted by identifying the clock pin of the flip-flop associated with each DSIP, tracing the fan-in of the clock pin until a stopping point is reached. In one embodiment, a stopping point may include, but is not limited to one or more of the following: (i) an input port of the target scope, or portion of the netlist, to be replayed, (ii) a divider (DFF) output port, (iii) a clock multiplexer (MUX) output port, (iv) a phase-locked loop (PLL) (clock generator module) output port, (v) a buffer output port, and (vi) an integrated clock gating (ICG) cell output port.

Figure 4:
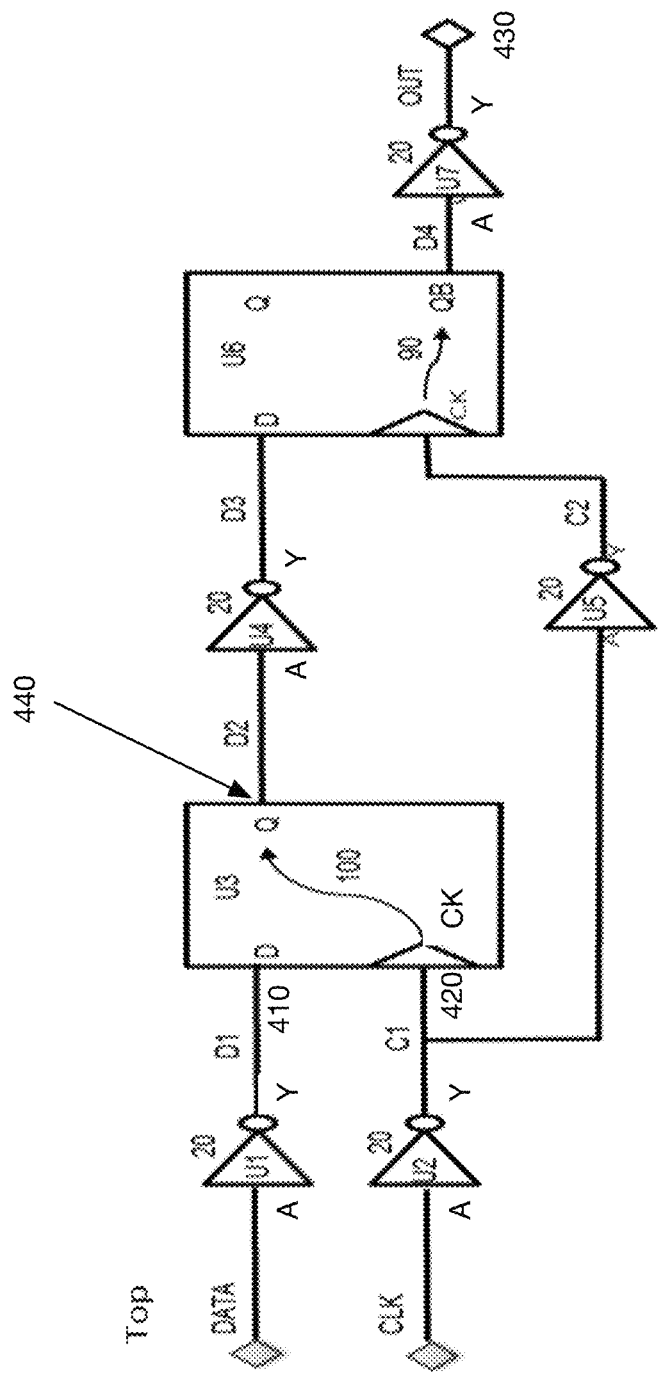
FIG. 4 is a simplified circuit schematic of an example netlist description of a circuit design portion including flip-flops.

FIG. 4 illustrates an example circuit schematic providing an example of the delay path extraction of the signal "U3.Q" 440, the output signal of element U3 as described in 230 of FIG. 2. From U3.Q 440, the process identifies flip-flop U3's clock pin 420 and traces to its fan-in wire "C1", followed by inverter U2, and wire "CLK" that connects to the boundary port CLK of the target design. Thus, the delay path of signal "U3.Q" includes: (a) a wire from Top.CLK to cell Top.U2, (b) Cell Top.U2's input port A to output port Y, (c) Wire Top.C1—connection cell Top.U2 to cell Top.U3, and (d) Cell Top.U3's CK port to output port Q.

Returning to FIG. 2, at 235, after the DSIP delay paths are identified, the process obtains the delay of each wire and cell on the delay path. In one embodiment, the delay is calculated using an SDF delay query interface sub-process that reads cell or wire delay from the SDF file. In one embodiment, the process annotates the delays on the delay path for each wire and cell of the DSIP.

Using the example described above with reference to FIG. 4, some example query results for each component on the path are indicated below:

| # Delay path | # delay from SDF |
|---|---|
| Wire from Top.CLK to cell Top.U2 | 3 μs |
| Cell Top.U2's input port A to output port Y | 20 μs |
| Wire Top.C1—connection cell Top.U2 to cell Top.U3 | 2 μs |
| Cell delay from Top.U3.CK to Top.U3.Q | 100 μs |
| Wire delay from Top.U2.Y to Top.U5.A | 4 μs |
| Cell delay from Top.U5.A to Top.U5.Y | 20 μs |
| Wire delay from Top.U5.Y to Top.U6.CK | 2 μs |
| Cell delay from Top.U6.CK to Top.U6.QB | 90 μs |

The process calculates the delay value of DSIP, U3.Q as set forth below:

Top.U3.Q delay=3 μs+20 μs+2 μs+100 μs=125 μs

Top.U6.QB delay=3 μs+20 μs+4 μs+20 μs+2 μs+90 μs=139 μs

In one embodiment, the DSIP delay file saves the calculated delayed value of each DSIP as in the example below:

| # DSIP | # DELAY VALUE |
|---|---|
| Top.U3.Q | #125 |
| Top.U6.QB | #139 |

For some DSIPs, there could be multiple paths connecting a input to the stop points. For these kinds of DSIPs, in one embodiment the process calculates the delay of all those paths. In one embodiment, the system chooses one of the path delays to store in the delay file. In one embodiment, the maximum delay path is chosen. In one embodiment, the delay file can store more than one path delay. In one embodiment, the process provides the user the option to choose path delay model: (1) maximum delay model: delay from the path with the longest accumulated path delay is applied; (2) random delay path model: randomly choose a delay path and apply its delay to the delay file; and (3) minimum delay model: the delay from the path with the shortest path delay is applied.

Using the annotated SDF delay values, at 240, the system calculates the DSIP's delay value by adding all the delays encountered by signals passed along its associated delay path, and stores it. In one embodiment, the calculated DSIP delay is written into a DSIP delay file for reference during subsequent parts of the process. Each DSIP delay file defines how much delay needs to be added during stimulus injection for the associated DSIP.

In one embodiment, the DSIP delay files are editable and the process allows a user to modify DSIP delay files in order to perform "what-if" analysis. What-if analysis enables the system to change the delay value of certain DSIPs to determine the impact of the change on glitch power, and determine what the result would be if the change were made.

The process then returns to 225, to determine whether more DSIPs need to be processed. If so, the process selects the next DSIP for evaluation, and continues to 230 for evaluation. Otherwise, the process continues to 245.

At 245, the DSIP delay file is created. In one embodiment, the DSIP delay file includes the delay data for all evaluated segments in the selected netlist for the selected replay window.

At 250, waveform replay simulation is performed. In one embodiment, this process uses data including waveform data from no-timing simulation, stimulus mapping file defining SIPs and their individual mapped signals from the source waveform data, SDF data, the user-designated target netlist for replay simulation, the user-defined target scope and time window for replay simulation, and the DSIP delay file data. This data may be referred to as the "simulation data set."

Figure 3:
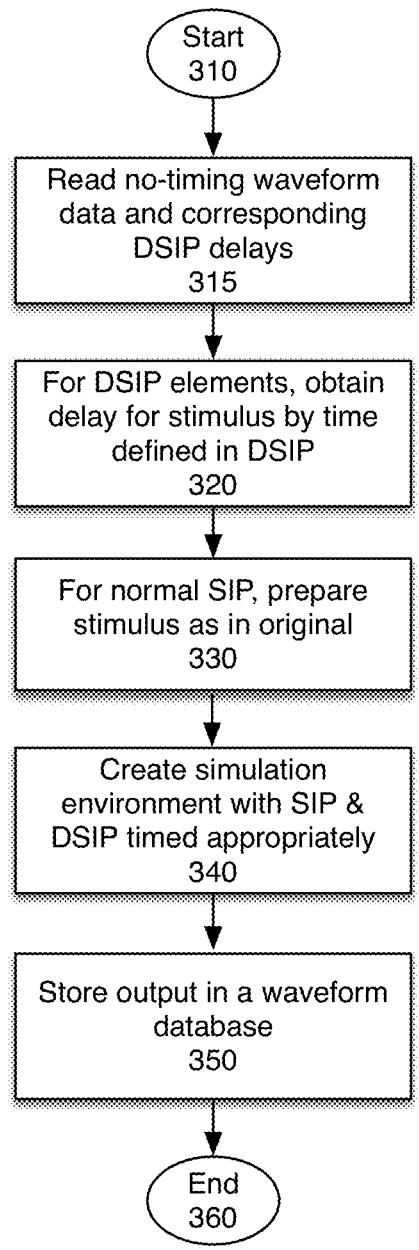
FIG. 3 is a flowchart of one embodiment of performing the waveform replay simulation.

FIG. 3 is a flowchart of one embodiment of performing the waveform replay simulation. The process starts at 310. This process corresponds to 250 of FIG. 2.

At 315, the process reads the no-timing stimulus from the input waveform data and the corresponding calculated DSIP delay from the DSIP delay file for the target netlist and target time window.

Figure 5:
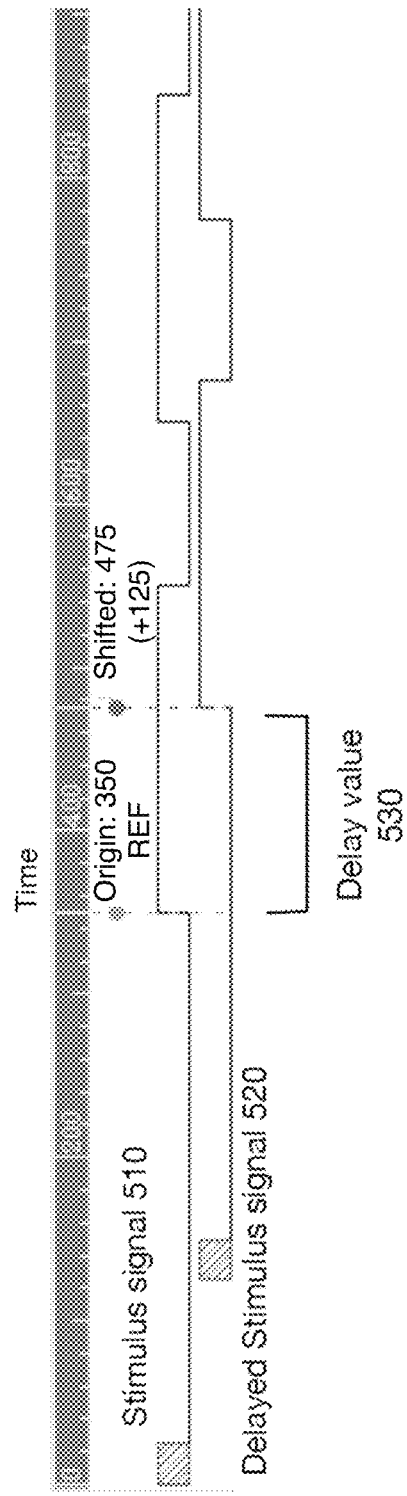
FIG. 5 is a timing diagram showing one embodiment of the time delay for an DSIP signal.

At 320, for each DSIP element, the stimulus signal is shifted by the time defined in the DSIP delay file. For example, returning to the example circuit of FIG. 4, assuming the stimulus to be injected to signal Top.U3.Q is shown as Top/U3/Q in FIG. 4, and the delay value of Top.U3.Q defined in the DSIP delay file is 125 μs, the updated stimulus is delayed by the DSIP value. FIG. 5 illustrates the shift of the stimulus signal 510 from the origin REF to the delayed stimulus signal 520, shifted by 125 μs from the origin 350 to starting point 475. The entire signal is shifted by the delay value 530, and will become the delayed stimulus signal waveform 520 as shown for signal Top/U3/Q→>125 μs.

At 330, for normal SIP (stimulus injection points), stimulus is prepared as in the original waveform of the source waveform data.

At 340, based on the netlist, the target design scope and SDF file provided by the user, the process creates simulation environment with SDF delays and feeds the normal and shifted stimulus signals to a replay simulator. The stimulus is injected with the right delay and propagated with the right delay on the netlist.

At 350, in one embodiment, store the output generated by the simulator in a waveform database, with SDF delay injected via stimulus and through simulation propagation. In one embodiment, this data can be used to perform the glitch analysis and glitch power estimation, as discussed above. In one embodiment, the user will be able to detect/observe the glitches for each individual signal for further analysis. The waveform database is the output of the simulator. The process then ends at block 360.

Returning to FIG. 2, at 255 the generated waveform database is optionally fed to a power analysis tool for glitch analysis and/or glitch power estimation.

The resulting glitch and glitch power data is stored at 260. This data may be made available to the circuit designer, and used to evaluate the circuit design for power use, and for selecting the appropriate power levels. The process then ends at 265.

Figure 6:
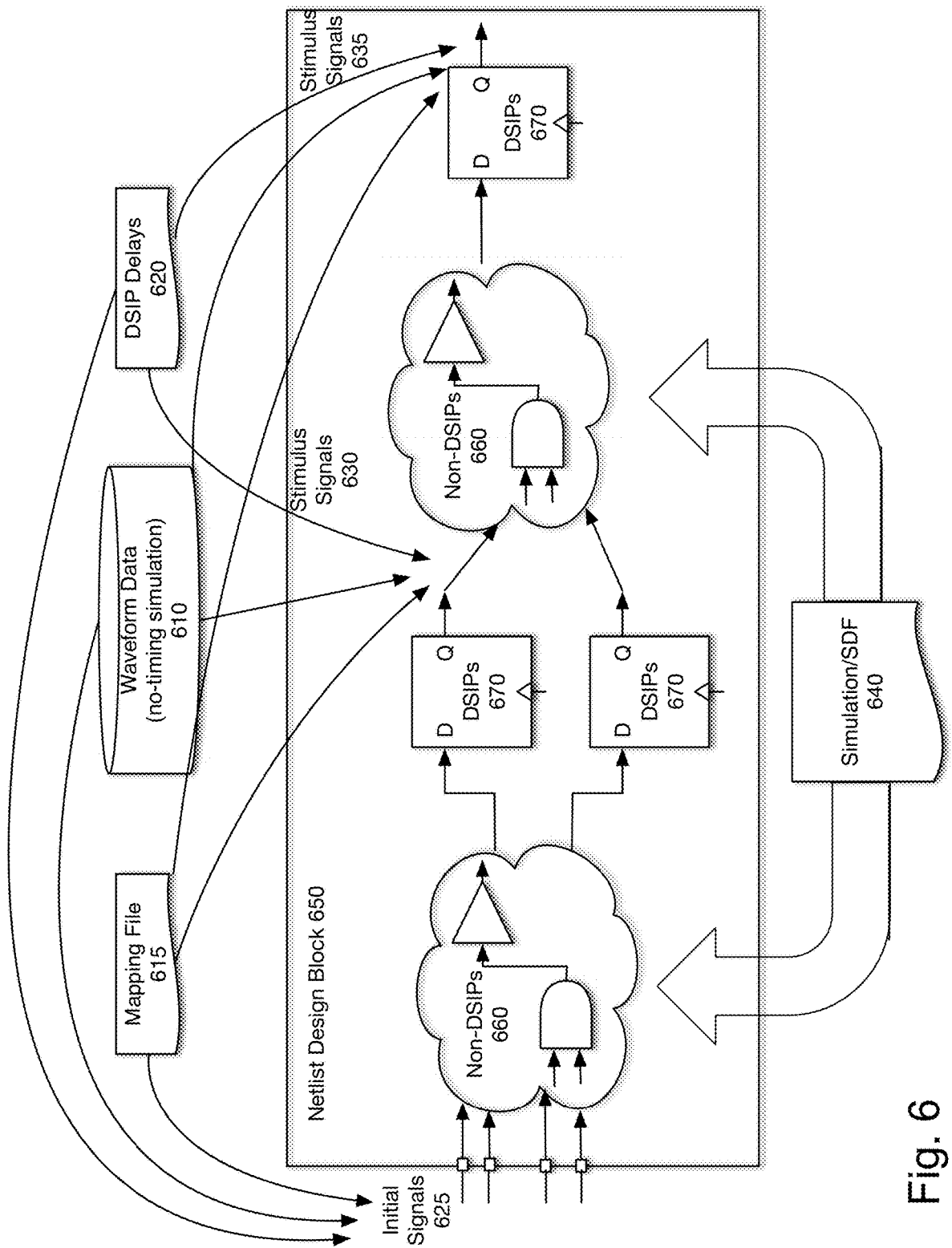
FIG. 6 is a diagram of one embodiment of a netlist design block, used with the system to simulate timing.

FIG. 6 illustrates elements of a netlist design block. The illustration shows a netlist design block 650 including two types of logic, DSIP logic 670 and non-DSIPs 660. Part of the logic (non-DSIPs 660) utilizes a timing simulator's 640 delay annotation.

The stimulus source, or stimulus mapping file 615, is from a no-timing simulation waveform. But the "replay" simulation utilizes annotated stimulus data, SDF delay 640, which annotates the timing for the cells/wires.

For DSIPs 670 (e.g., PI_A, PI_CLK, flip-flops and/or cells with output Q), stimulus signals 630, 635 are injected on a cycle-by-cycle schedule using the correct delay. The stimulus signals 630, 635 are based on the waveform data 610, mapping file 615, and DSIP delays 620, as discussed above. In one embodiment, the delay values are calculated in accordance with the process discussed above with respect to FIG. 2.

For the cells in the cloud circles (combinational logic) non-DSIPs 660, after the stimulus with delay is injected through DSIPs 670, the simulator 640 then propagates those signals to the non-DSIPs. In one embodiment, the propagation process for non-DSIPs is a timing simulation. The simulator 640 propagation activities include adding cell and wire delays that are defined in SDF delay. Otherwise, only the delay of the DSIPs are represented but the delays of the non-DSIPs will be missing.

For a first type of timing simulation, the whole netlist utilizes the simulator's delay annotation and propagation. In one embodiment, a timing simulation environment with a testbench generating the stimulus for the whole netlist is generated. The timing simulator injects stimulus generated by its testbench to the netlist's top-level boundary ports/interfaces. The timing simulation is then performed on the whole netlist from time 0. The activities and delays of all the cell and wires of the netlist are propagated by the timing simulators. Such timing simulation has no DSIPs pre-defined and no reference to a no-timing simulation waveform. All cell and wires' delays and activities are propagated by a timing simulator. Thus such simulation must always begin at time 0 because target netlist's internal states and delays at any given time depends on the activities from previous cycle(s). Therefore, the simulation needs be run for the whole netlist, and start from time 0. Thus, this type of timing simulation cannot simulate a sub-block of the netlist or a subset of the time.

In contrast, because the present system has the netlist's internal state at any given time, any given sub-block can be fetched from the source no-timing simulation waveform data. The initial signals 625 are obtained, and the delay of the DSIP is prepared as described above, and does not depend on the simulator's annotation.

Thus, the modified "replay" simulation described can be run for any specified time window and sub-block. This is valuable because a user may need to analyze a glitch from a small time window where the power peak/glitch peak happens. It also enables a much faster simulation for the relevant data. Running timing simulation for a smaller time window also reduces the timing simulation time, processor use, and memory use. Furthermore, the system is able to simulate a hotspot, to identify a glitch from some hotspot sub-blocks where the power surge/glitch happens. Thus, running timing simulation from a sub-block reduces the timing simulation time, and enables focus on specific problem areas in location as well as timing. Thus, the present system enables a more efficient way to identify and quantify the impact of power glitches in a complex system. This process may be utilized at various stages of the integrated circuit design. In one embodiment, it may be used as early as during initial logical design and synthesis, which is earlier than other glitch power systems, because it utilizes non-timed simulations and does not require RTL test bench and other data that are not available at earlier stages of the design process.

In the system described above, the ability to correlate the delays and waveforms, and other data relies on consistent naming of signals. Signal name mismatching is a common and serious problem in IC design and verification, especially in complex flows involving various tools, mixed HDL languages, and representation levels. Signal mismatching may include any combination of mismatches such as:

Escape Name: top.\A123?→top.A123?
Case Sensitivity: tb.dft.m1.IN[2]→tb.dft.m1.in[2]
Ungroup Scope: tb.TOP.U2.U1.Q→tb.TOP.U2 U1.Q
Missing Scope: U1.genblk3.signal[1].genblk1.DOUT→U1.signal[1].DOUT
Typo: top.U1.U2.ABC→Top.U1.U2.ACB
Delimiter: top.U1.U2.ABC→Top/U1/U2/ABC
White Space Drop: "top.\A123?"→"top.\A123?"

In one embodiment, a hierarchical name rectification system may be utilized. A hierarchical name rectification system provides a machine learning based approach to provide general and accurate rectification results. A framework and methods to transform the hierarchical name rectification problem using machine learning technology is described. A method, implemented with a computer system, develops a framework to search the design for a most similar hierarchical name. The name rectification problem is transformed into the similarity search problem where the most similar name becomes the rectified signal name.

Mismatching hierarchical names between different IC design stages and EDA tools are resolved by the present framework that searches the design tree for the most similar hierarchical name. In one embodiment, two categories of similarity search methods are utilized, direct string comparisons and indirect vector comparisons. For the former category, distance functions are utilized to properly measure the similarity of strings representing hierarchical names. For the latter category, name strings are first encoded into vectors, and then mapped to a low-dimensional latent space by similarity using a neural network. This description also proposes embodiments of the architectures of the network, and corresponding methods to train the network using similarity learning.

The proposed methods provide faster and more general hierarchical name rectification than previous methods. First, the similarity search methods provide general comparisons between hierarchical names, regardless of the fault types. Second, the similarity learning methods accelerate the searching process by discovering and compressing the design and mismatching names into low-dimensional vectors.

The proposed framework can be integrated into existing EDA tools to rectify signal names, once the strings can be represented hierarchically. It can be applied to interactive mode to provide rectification recommendations to the users. It can also be applied to batch mode to resume the IC design and verification from interrupt.

Figure 7:
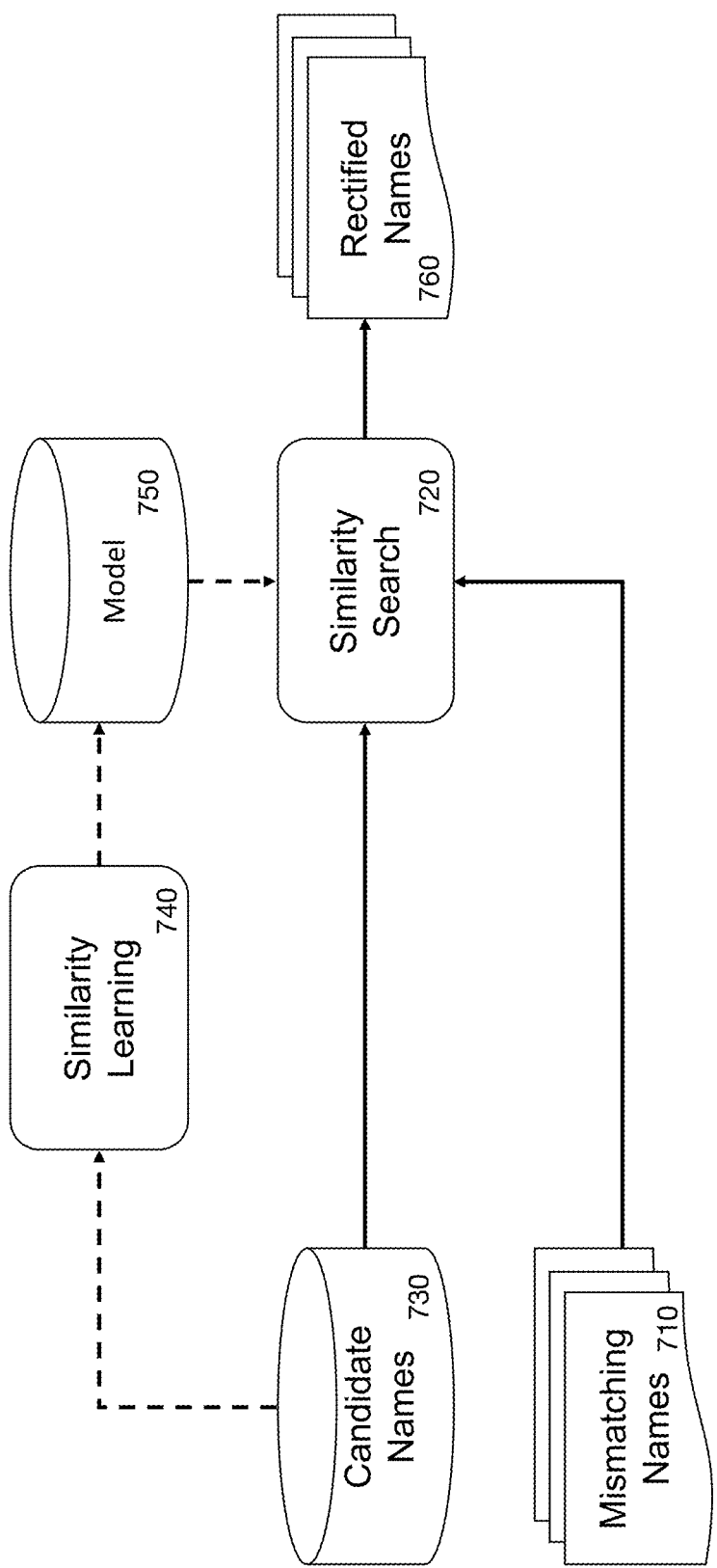
FIG. 7 illustrates one embodiment of a name rectification framework based on similarity search.

FIG. 7 illustrates a rectification framework where a similarity search is applied between the original names and the mismatching names. The framework utilizes a similarity search 720 to compare mismatching names 710 to candidate names 730 to produce rectified names 760. At each iteration, one mismatching signal name 710 is fed into the similarity search function 720 to find the corresponding corrected name. For each mismatching signal name, the most similar name in design is regarded as the corrected name among the candidate names 730, and is considered the rectified name 760.

In one embodiment, the similarity search 720 may include string comparison approaches and/or vector comparison approaches. The string comparison methods traverse the design to find the most similar signal. In one embodiment, the string comparison approach may be a full search using string comparison or tree search using string comparison. In one embodiment, the vector comparison approach may be nearest neighbor search with distance-loss locality sensitive hashing or nearest neighbor search with triplet-loss locality sensitive hashing. In one embodiment, the vector comparison module encodes all hierarchical names into vectors using locality sensitive hashing (LSH) and then find the most similar signal using nearest neighbor search (NNS).

In one embodiment, the similarity search 720 utilizes a machine learning model 750 trained by similarity learning 740 for vector comparison approaches. The similarity learning 740 uses the candidate names 730 for training. In one embodiment, if the string-based comparison is used, the system may not include the similarity learning.

According to the similarity learning scheme in LSH, in one embodiment, there are two methods in the vector comparison category; specifically, a distance-loss method and the triplet-loss method. The distance-loss for similarity learning method and triplet-loss for similarity learning method are detailed below. Both methods apply supervised similarity learning to train and encode hierarchical names from strings into vectors using LSH, such that the distance in the metric space could represent the similarity between hierarchical names.

The full search method traverses the whole design to compare the distance between signal names. For each mismatching signal, the candidate signal in the IC design having the shortest distance is regarded as the corrected name. When considering the example mismatches between names, such as the ones listed above, it is clear that in many cases strings only differ by some characters or some scopes, thus may be rectified through string comparisons. In full search, the candidate names comprise all the hierarchical names in the design. In one embodiment, the rectified name is the candidate name having the minimum distance to the mismatching name.

In one embodiment, string comparison functions are exploited to analyze components of two hierarchical names for evaluating the similarity. Several distance functions can be chosen for full search, in one embodiment: edit distance, case-insensitive distance, case-semi-sensitive distance, and hierarchical distance.

Edit distance is a way of estimating similarity of two strings by counting the minimum number of edit operations. The smaller edit distance means the two strings are more similar. In one embodiment, Levenshtein distance is used to compare signal names with three edit operations, including insertion, deletion, and substitution of a character.

In one embodiment, case-insensitive distance is similar to edit distance with one pre-processing step to remove case sensitivity. Two input strings are first transformed into lower case, and then the edit distance is calculated between the lower-case strings. Case-semi-sensitive distance is the average of the edit distance and the case-insensitive distance.

Hierarchical distance is built on top of edit distance with additional considerations of edit operations on scope hierarchy. The scopes of a hierarchical name are split by a specific delimiter. The three edit operations are applied in character-granularity and scope-granularity, respectively. This hierarchical distance is the weighted average of the edit distance of characters and the edit distance of scopes, normalized by their lengths, respectively.

The specific distance functions used may be selected by users. The hierarchical distance function, which considers most situations, is suitable for general evaluation; it could be simplified into the other distance functions when possible mismatching types are known beforehand.

Taking the mismatching name "tb.dft.m1.IN[2]" and the corresponding correct name "tb.dft.m1.in[2]" as an example, there are 15 characters and 4 scope levels. The character distance is 2/15, and the scope distance is 1/4; the case-insensitive distances are both 0. In one embodiment, the case-semi-distance and hierarchical distance are weighted averages.

The tree search methods traverse the design hierarchy using breadth-first-search (BFS) to compare the distance between signal names. For each mismatching signal, the candidate signal in the IC design having the shortest distance is regarded as the corrected name. For the design, which is in tree structure, the number of candidate signals can be reduced. The string comparison functions are, in one embodiment, as described above.

The design is viewed as a tree hierarchy where the root is the top scope. A scope could contain sub-scopes and signals. The leaves are signals or empty scopes. There are two tree search methods, top-down and bottom-up.

The top-down tree search method traverses the design from the top level, passing the underlying child scopes to a queue and comparing the similarity of strings in the queue path with the mismatching name. If one of the top scopes matches with the beginning of the mismatching name, the child scopes of the matched scope are expanded and added to the queue, while other scopes are dropped. If none of the top scopes matches, all their child scopes are expanded and added to the queue; and then the parent scope of the most similar child scope is kept as the new top, while other strings are dropped. This process is repeated until the process reaches the leaves.

Bottom-up tree search method traverses the design from the leaf nodes. The first step is splitting the full hierarchical name of mismatching name with delimiters into multiple scope names and checking the last scope name is in the design or not. If there is only one signal name in the design matching the last scope name of the split full name, it is determined to be the rectification result. If there are multiple signal names in the design matching the last scope name, the rectification result is determined by comparing to the mismatching hierarchical name with string comparison function. If nothing matched for the last scope, this bottom-up tree search becomes full search or top-down tree search as described above.

The nearest neighbor search (NNS) method includes the similarity learning step and the similarity search step. In the similarity learning step, LSH is exploited to optimize an ML-based encoder using the distance-loss function, such that the encoded vectors represent the string similarity in metric space. In the similarity search step, the trained encoder is exploited to encode all the candidate names together with each mismatching name into vectors for NNS.

Figure 8:
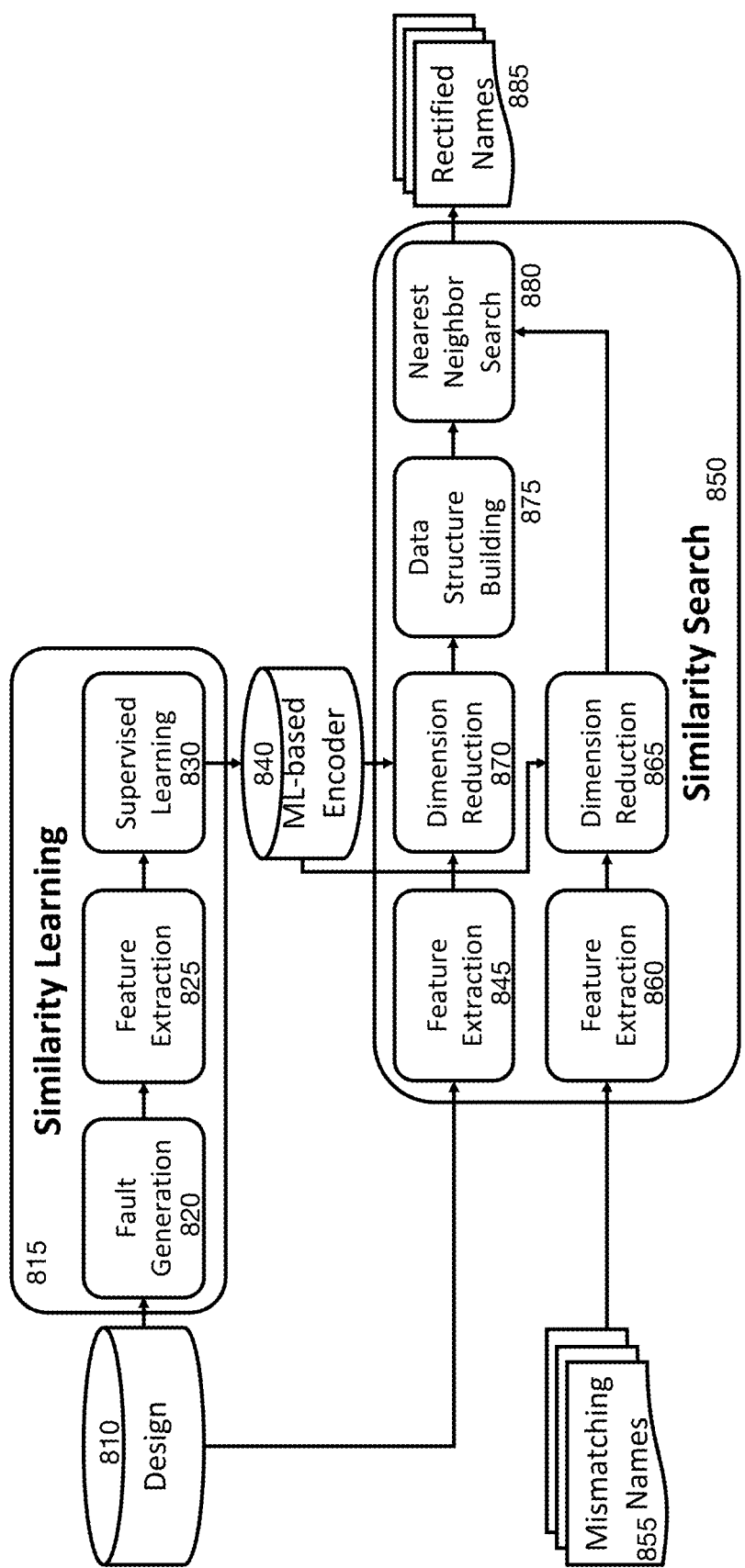
FIG. 8 illustrates one embodiment of a similarity learning and similarity search system, which may utilize a machine learning (ML)-based encoder to produce rectified names.

FIG. 8 illustrates one embodiment of a similarity learning and similarity search system, which may utilize a machine learning (ML)-based encoder to produce rectified names. The similarity learning step of LSH takes design as input and produces an ML-based encoder as output. Similarity learning 815, in one embodiment, includes several logical elements, which in one embodiment includes fault generation 820, feature extraction 825, and supervised learning 830. Similarity learning may also include string comparison, in one embodiment.

In fault generation 820, each signal name in the design is injected with existing fault types. In one embodiment, string pairs or string triples are generated, including an anchor string.

In feature extraction 825, the varying-length strings are transformed to fixed-size high-dimensional vectors.

In supervised learning 830, in one embodiment, the Siamese neural network learns to transform the pairs or triplets of the high-dimensional feature vectors into the low-dimensional LSH vector, as described above, to train the ML-based encoder 840, which in one embodiment is used by the similarity search 850.

The similarity search 850 takes design 810, mismatching names 855, and in one embodiment the trained ML-based encoder 840 as inputs, and produces the rectified names 885 as output. Similarity search 850 includes several elements, including feature extraction 860, 845, encoding for dimension reduction 865, 870, data structure building 875, and nearest neighbor search 880. The output of the similarity search are the rectified names 885.

In feature extraction 860, the mismatching names 855 are transformed. In one embodiment, this may be done using the method described above. In dimension reduction 865, in one embodiment, high-dimensional feature vectors produced by feature extraction 860 are encoded into low-dimensional LSH vectors using the ML-based encoding 840. Dimension reduction 865 takes feature extraction 860 from mismatching names 855, and ML-based encoder (model) 840 as inputs and produces mismatching LSH vectors for nearest neighbor search 880.

Feature extraction 845 receives design data 810 as input, and extracts features for dimension reduction. Dimension reduction 870 takes the outputs of feature extraction 845 and ML-based encoder (model) 840 as inputs, in one embodiment, and produces candidate LSH vectors for data structure building 875. In data structure building 875, the LSH vectors of the design are built as a k-dimensional tree (k-d tree). This tree structure is a space-partitioning data structure for organizing points in a k-dimensional space.

In nearest neighbor search (NNS) 880, the LSH vectors of each mismatching signals is fed into the k-d tree to find the nearest candidate signal, which represents the most similar name in the design.

The Nearest Neighbor Search (NNS) with Triplet-Loss Locality Sensitive Hashing (LSH) method includes the similarity learning based on LSH and the similarity search step based on NNS, similar to the method discussed above. In the similarity learning process, in one embodiment, the ML model is optimized using the triplet-loss function to learn the string similarity in metric space; no explicit distance function is needed in this method. Then in the similarity search, the rectified hierarchical name is produced by NNS.

Figure 9:
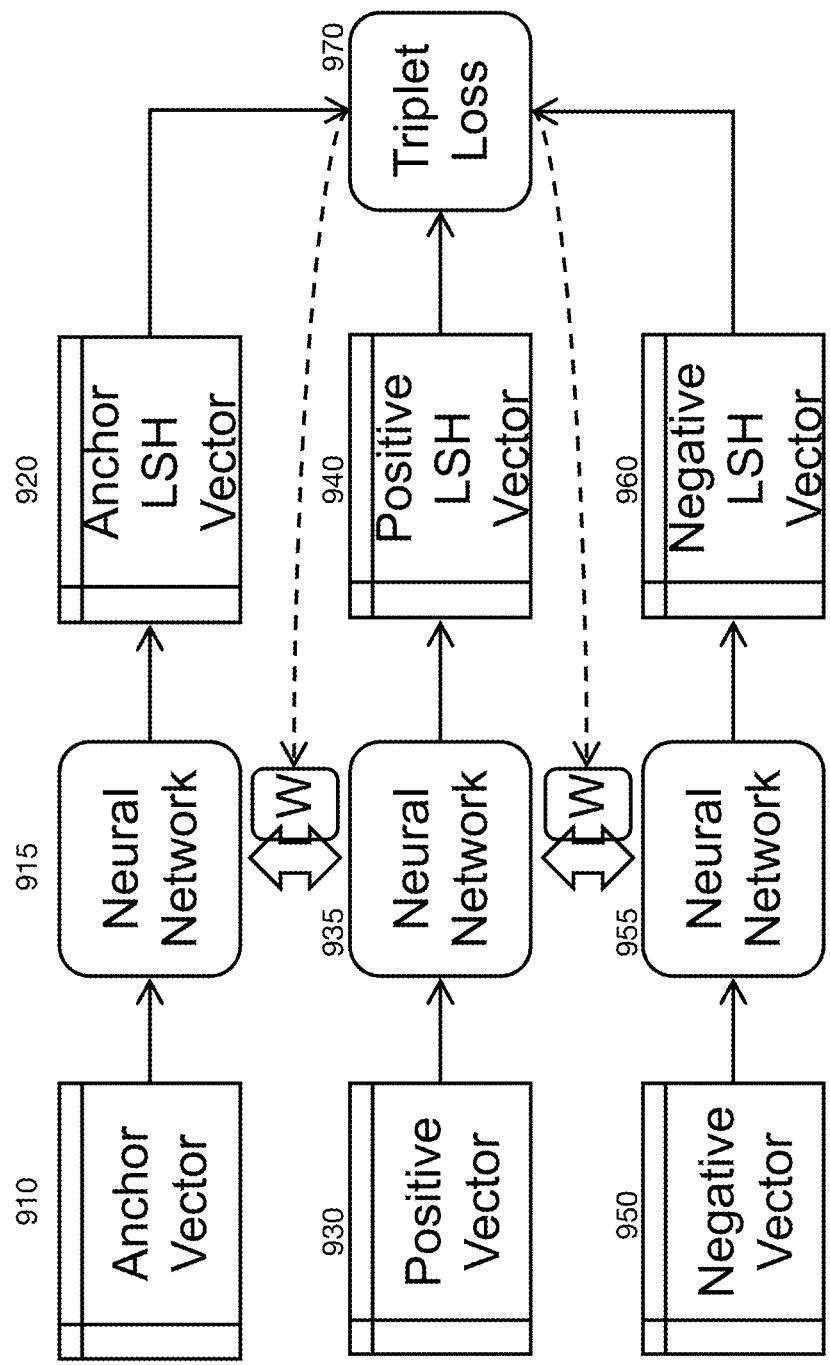
FIG. 9 illustrates one embodiment of a Siamese neural network for learning to embed similarity and dissimilarity of triplets.

In one embodiment, as illustrated in FIG. 9, triplets instead of pairs are generated, extracted, and fed into the neural network to learn the similarity.

In one embodiment, in fault generation, each signal name in design is injected with existing fault types as described above. In addition to the original signal name as the positive and the injected signal name as the anchor, another hierarchical name is picked from candidate names as the negative sample to form a triplet of strings.

In feature extraction, each varying-length string in the triplet is transformed to fixed-size high-dimensional vector using bag-of-characters or character-n-gram, as described above. These are the anchor vector 910, positive vector 930, and negative vector 950.

In supervised learning, the Siamese neural network 915, 935, 955 learns to transform the triplets of the high-dimensional feature vector into the low-dimensional LSH vectors 920, 940, 960, as described above. The Siamese neural network in one embodiment is composed of triplet networks 915, 935, 955, which share their parameters of neural layers but accept a triplet of inputs. This type of machine learning neural net configuration is not the standard neural network, and provides advantages in using vector triplets, as described.

Then, an implicit loss function, in one embodiment triplet loss 970, is used to not only shorten the distance between anchor LSH vectors 920 and positive LSH vectors 940, but also enlarge the distance between anchor LSH vectors 920 and negative LSH vectors 960 in metric space. In one embodiment, the implicit loss function 970 can be chosen in triplet loss, contrastive loss, center loss, and so on. At last, the neural network 915, 935, 955 learns to embed the similarity and dissimilarity of the two triplets by adjusting the internal weights. In one embodiment, the similarity search is the same as described above, using the neural network trained by implicit loss as the encoder of dimension reduction.

Figure 10A:
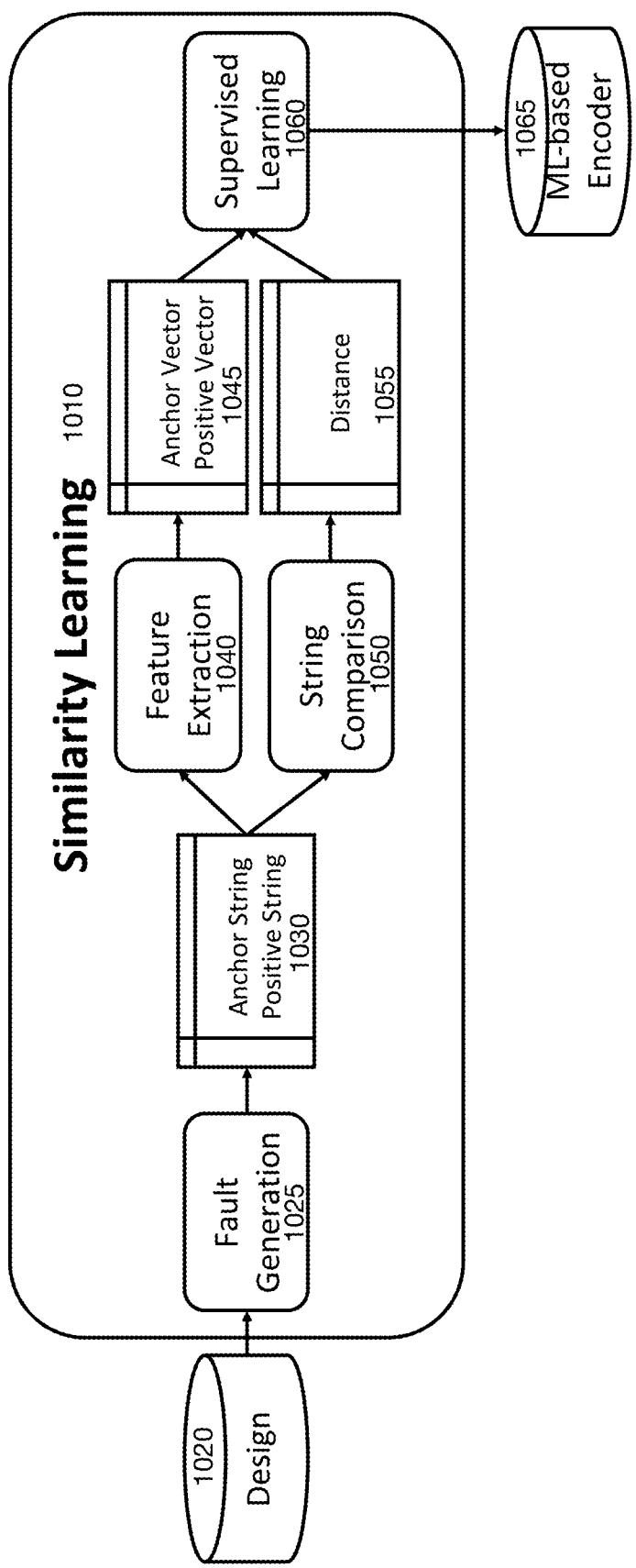
FIG. 10A is a block diagram of one embodiment of similarity learning, using distance loss.

FIG. 10A is a block diagram of one embodiment of similarity learning using distance loss. The similarity learning 1010 takes design 1020, and outputs the ML-based encoder 1065.

In fault generation 1025, each signal name in the design is injected with existing fault types. In one embodiment, several string pairs are generated with the original signal name as the positive, and the injected signal name as the anchor. The output of the fault generation 1025 is the anchor string and the positive string 1030. The anchor string and positive string 1030 are used by feature extraction 1040, and string comparison 1050.

Feature extraction 1040 transforms each varying-length string in the pair to a fixed-size high-dimensional vector, the anchor vector and positive vector 1045. In one embodiment, one of two schemes is chosen, bag of characters and character-n-gram. Bag-of-characters disregards character order but keeps multiplicity by scanning and counting the number of each character from a string. Character n-gram keeps local partial order by scanning and counting the number of each n-gram tuple of characters. The anchor vector and positive vector 1045 are passed to supervised learning 1060.

In string comparison 1050, the distance between the anchor string and the positive string 1030 is calculated using one or more of the string comparison functions to generate a distance between the strings. The distance 1055 is passed to supervised learning 1060.

In supervised learning 1060, a neural network uses the pair (anchor vector and positive vector 1045, and the associated distance 1055, to learns to transform the pairs of the high-dimensional feature vectors into corresponding low-dimensional LSH vectors, such that the distance is close to the one in string comparison. In one embodiment, the supervised learning 1060 is implemented by a Siamese neural network. A Siamese network is composed of twin networks which share their parameters of neural layers but accept a pair of inputs. In one embodiment, the loss is back-propagated to the Siamese neural network to adjust the weights. The architecture of this twin networks can be chosen from multi-layer perceptron (MLP), convolutional neural network (CNN), recurrent neural network (RNN), or any other types of neural networks. The output of supervised learning 1060 is the ML-based encoder model 1065, which is used in one embodiment by similarity search.

Figure 10B:
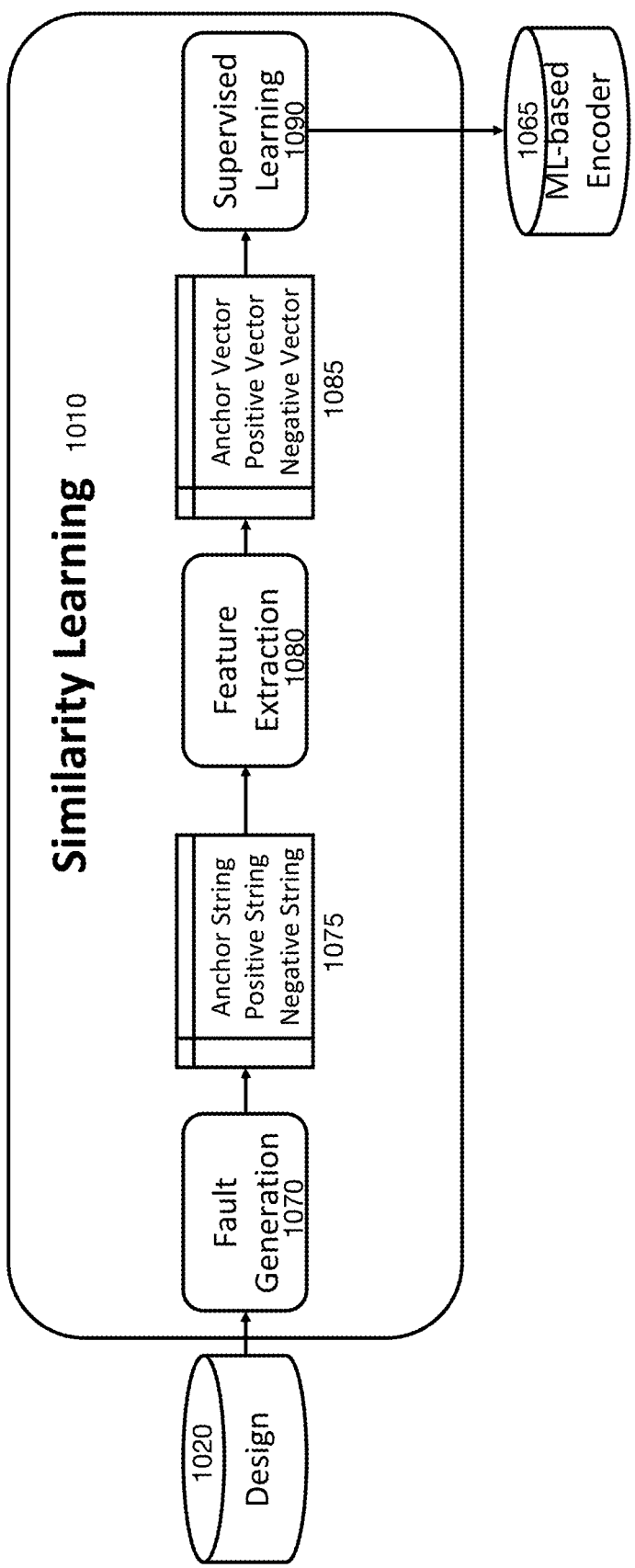
FIG. 10B is a block diagram of one embodiment of similarity learning, using triplet loss.

FIG. 10B is a block diagram of similarity learning using triplet loss. The design 1020 is input to the similarity learning system 1010.

In fault generation 1070, each signal name in the design is injected with existing fault types. In one embodiment, several triples are generated, outputting an anchor string, positive string, and negative string 1075. The strings 1075 are passed to feature extraction 1080.

Feature extraction 1080 is used to transform each varying-length string in the triple to a fixed-size high-dimensional vector, producing anchor vector, positive vector, and negative vector 1085. The vectors 1085 are passed to supervised learning 1090.

Supervised learning 1090 comprises a neural network to transform the triple (anchor vector, positive vector, and negative vector) 1085 of the high-dimensional feature vectors into corresponding low-dimensional LSH vectors. In one embodiment, the supervised learning 1090 is implemented by a Siamese neural network. One embodiment of the Siamese network is described with respect to FIG. 9. The output of supervised learning 1090 is the ML-based encoder model 1065, which is used in one embodiment by similarity search.

Scope and signal name mismatching is a common and serious problem in IC design and verification, especially in complex flows involving various tools, mixed HDL languages, and representation levels. Compared with rule-base heuristics, the ML-based approach described above provides general and accurate rectification results. This approach may be utilized at various stages of the integrated circuit design, in addition to being utilized during the glitch detection and power estimation process, as described above. For example, the approach may be useful during netlist verification and design planning. It may also be useful in emulation systems, which utilize data from multiple sources that may lead to signal name mismatch.

Figure 11:
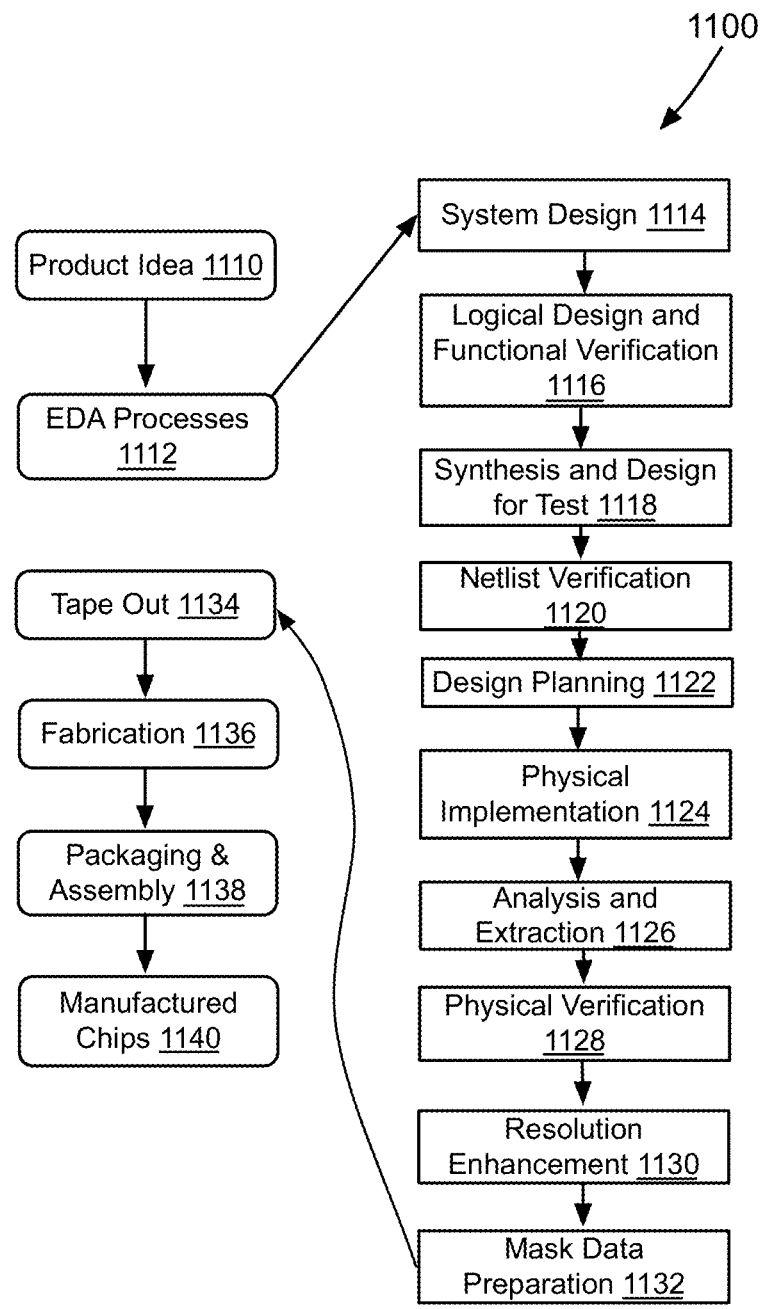
FIG. 11 illustrates an example set of processes used during the design, verification, and fabrication of an article of manufacture such as an integrated circuit.

FIG. 11 illustrates an example set of processes 1100 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1110 with information supplied by a designer, information which is transformed to create an article of manufacture that uses a set of EDA processes 1112. When the design is finalized, the design is taped-out 1134, which is when artwork (e.g., geometric patterns) for the integrated circuit is sent to a fabrication facility to manufacture the mask set, which is then used to manufacture the integrated circuit. After tape-out, a semiconductor die is fabricated 1136 and packaging and assembly processes 1138 are performed to produce the finished integrated circuit 1140.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 11. The processes described by be enabled by EDA products (or tools).

During system design 1114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1118, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1120, the netlist is checked for compliance with timing constraints and for correspondence with the HDL code. During design planning 1122, an overall floor plan for the integrated circuit is constructed and analyzed for timing and top-level routing.

During layout or physical implementation 1124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1126, the circuit function is verified at the layout level, which permits refinement of the layout design. During physical verification 1128, the layout design is checked to ensure that manufacturing constraints are correct, such as DRC constraints, electrical constraints, lithographic constraints, and that circuitry function matches the HDL design specification. During resolution enhancement 1130, the geometry of the layout is transformed to improve how the circuit design is manufactured.

During tape-out, data is created to be used (after lithographic enhancements are applied if appropriate) for production of lithography masks. During mask data preparation 1132, the 'tape-out' data is used to produce lithography masks that are used to produce finished integrated circuits.

A storage subsystem of a computer system (such as computer system 1300 of FIG. 13, or host system 1207 of FIG. 12) may be used to store the programs and data structures that are used by some or all of the EDA products described herein, and products used for development of cells for the library and for physical and logical design that use the library.

Figure 12:
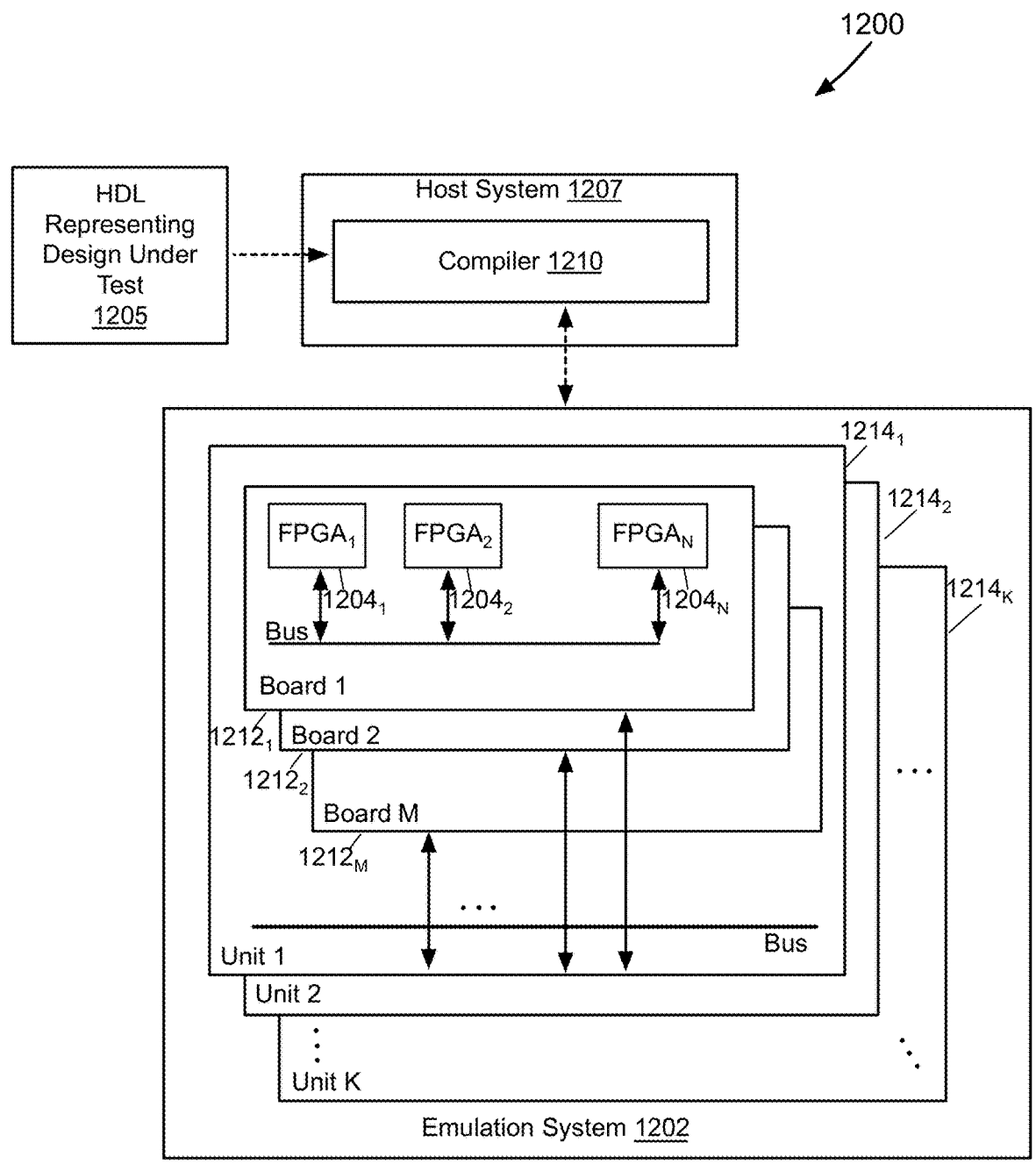
FIG. 12 depicts a diagram of an example emulation environment.

FIG. 12 depicts a diagram of an example emulation environment 1200. An emulation environment 1200 may be configured to verify the functionality of the circuit design. The emulation environment 1200 may include a host system 1207 (e.g., a computer that is part of an EDA system) and an emulation system 1202 (e.g., a set of programmable devices such as Field Programmable Gate Arrays (FPGAs) or processors). The host system generates data and information by using a compiler 1210 to structure the emulation system to emulate a circuit design. A circuit design to be emulated is also referred to as a Design Under Test ('DUT') where data and information from the emulation are used to verify the functionality of the DUT.

The host system 1207 may include one or more processors. In the embodiment where the host system includes multiple processors, the functions described herein as being performed by the host system can be distributed among the multiple processors. The host system 1207 may include a compiler 1210 to transform specifications written in a description language that represents a DUT and to produce data (e.g., binary data) and information that is used to structure the emulation system 1202 to emulate the DUT. The compiler 1210 can transform, change, restructure, add new functions to, and/or control the timing of the DUT.

The host system 1207 and emulation system 1202 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 1202.11. The host system 1207 and emulation system 1202 can exchange data and information through a third device such as a network server.

The emulation system 1202 includes multiple FPGAs (or other modules) such as FPGAs $1204_1$ and $1204_2$ as well as additional FPGAs to $1204_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 1202 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $1204_1$-$804_N$ may be placed onto one or more boards $1212_1$ and $1212_2$ as well as additional boards through $1212_M$. Multiple boards can be placed into an emulation unit $1214_1$. The boards within an emulation unit can be connected using the backplane of the emulation unit or any other types of connections. In addition, multiple emulation units (e.g., $1214_1$ and $1214_2$ through $1214_K$) can be connected to each other by cables or any other means to form a multi-emulation unit system.

For a DUT that is to be emulated, the host system 300 transmits one or more bit files to the emulation system 1202. The bit files may specify a description of the DUT and may further specify partitions of the DUT created by the host system 1207 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 1207 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection.

Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 1207 and/or the compiler 1210 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 1205 into gate level logic. For a DUT that is to be emulated, the design synthesizer sub-system receives a description of the DUT. If the description of the DUT is fully or partially in HDL (e.g., RTL or other level of abstraction), the design synthesizer sub-system synthesizes the HDL of the DUT to create a gate level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 13:
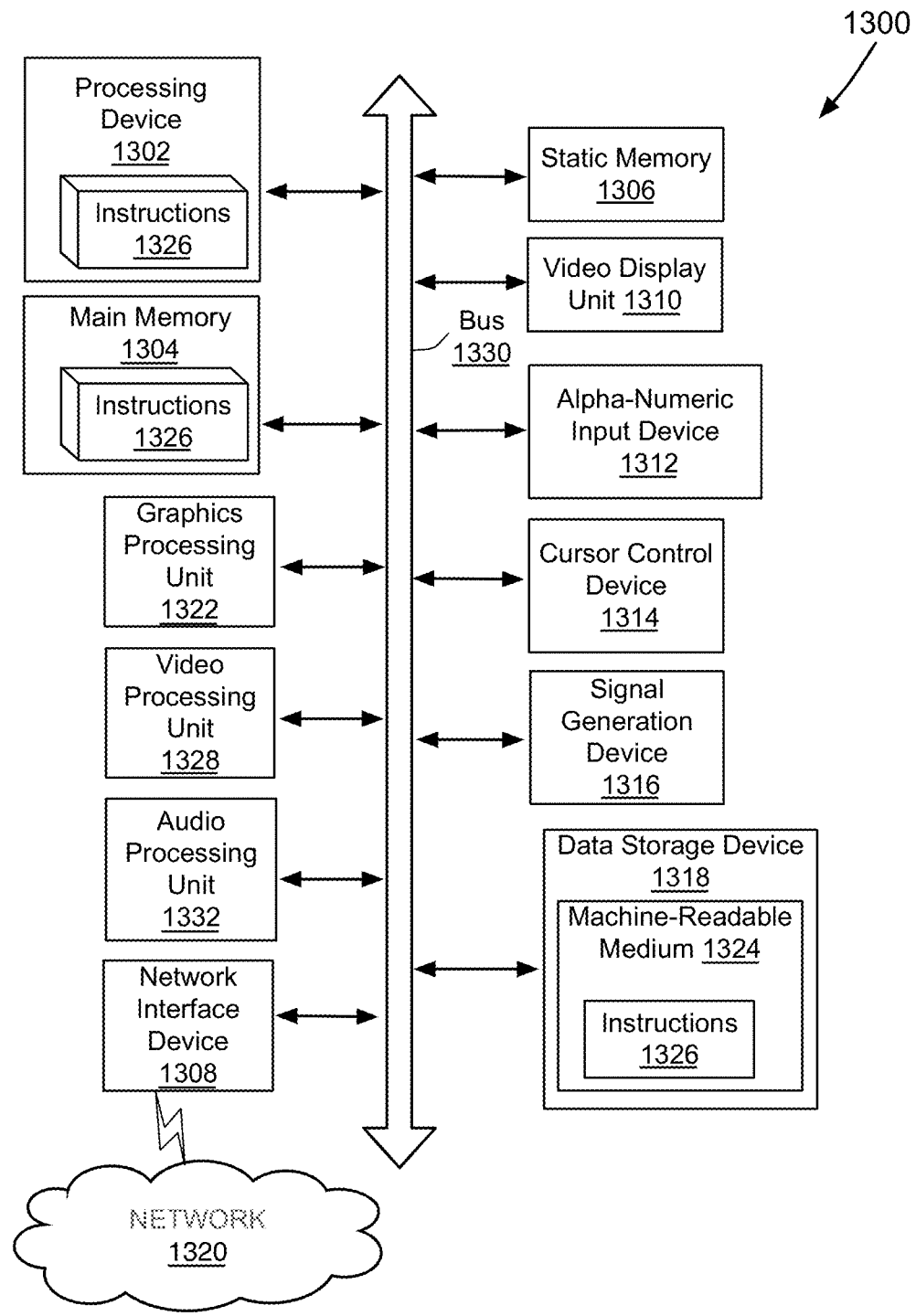
FIG. 13 illustrates an example machine of a computer system within which a set of instructions, for causing the machine to perform any one or more of the methodologies discussed herein, may be executed.

FIG. 13 illustrates an example machine of a computer system 1300 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1300 includes a processing device 1302, a main memory 1304 (e.g., read-only memory (ROM), flash memory, dynamic random access memory (DRAM) such as synchronous DRAM (SDRAM), a static memory 1306 (e.g., flash memory, static random access memory (SRAM), etc.), and a data storage device 1318, which communicate with each other via a bus 1330.

Processing device 1302 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. The processing device 1302 may be configured to execute instructions 1326 for performing the operations and steps described herein.

The computer system 1300 may further include a network interface device 1308 to communicate over the network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a graphics processing unit 1322, a signal generation device 1316 (e.g., a speaker), graphics processing unit 1322, video processing unit 1328, and audio processing unit 1332.

The data storage device 1318 may include a machine-readable storage medium 1324 (also known as a non-transitory computer-readable medium) on which is stored one or more sets of instructions 1326 or software embodying any one or more of the methodologies or functions described herein. The instructions 1326 may also reside, completely or at least partially, within the main memory 1304 and/or within the processing device 1302 during execution thereof by the computer system 1300, the main memory 1304 and the processing device 1302 also constituting machine-readable storage media.

In some implementations, the instructions 1326 include instructions to implement functionality corresponding to the present disclosure. While the machine-readable storage medium 1324 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1302 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

The invention claimed is:

1. A method for determining a glitch power consumption of a circuit, comprising:
   receiving functional waveform simulation data for the circuit, the waveform simulation data including a first signal;
   identifying a delayed stimulus injection point (DSIP) for the first signal;
   determining a total delay for the first signal, the total delay being a time to propagate stimulus signals to the DSIP; and
   performing waveform replay simulation including injecting the first signal at the DSIP at a time based on the total delay for the first signal, to calculate the glitch power consumption in the circuit.

2. The method of claim 1, wherein the waveform replay simulation is performed for a portion of a netlist representing the circuit.

3. The method of claim 1, wherein the waveform replay simulation is performed for a time window starting at a time t that is greater than zero.

4. The method of claim 1, wherein determining the total delay for the first signal comprises:
   extracting one or more delay paths for the DSIP;
   accumulating a total delay for the one or more delay paths; and
   setting the total delay for the first signal for the DSIP when running the waveform replay simulation.

5. The method of claim 2, wherein when the DSIP includes a plurality of paths, one of the plurality of paths is selected for the total delay.

6. The method of claim 1, further comprising:
   generating a stimulus mapping file including a set of stimulus injection points (SIPs) read from the circuit's netlist and associated mapped stimulus sources read from a stimulus mapping file.

7. The method of claim 6, further comprising:
   identifying a subset of DSIPs from the set of SIPs in the stimulus mapping file.

8. The method of claim 1, further comprising:
   extracting a delay path for each DSIP by tracing back from a clock pin to a stop point, wherein the stop point comprises one of: an input port of a target scope to be replayed, divider (DFF) output port, clock multiplexer output port, phase-locked loop (PLL) clock generator module output port, buffer output port, and an integrated clock gating (ICG) cell output port.

9. The method of claim 1, further comprising:
   performing a gate level waveform replay simulation of a portion of the circuit using a portion of the circuit, the replay simulation including injecting stimulus signals at each stimulus injection point (SIP) and utilizing a DSIP delay file to determine a timing for the injected stimulus signals' propagation along a corresponding delay path; and generating a replay timing waveform database including detected glitches generated during the replay simulation.

10. The method of claim 9, further comprising:
performing glitch power analysis using the glitches detected during performance of the replay simulation.

11. The method of claim 1, further comprising:
identifying one or more stimulus injection points (SIPs) in the circuit;
identifying one or more DSIPs from the SIPs;
wherein the waveform replay simulation comprises:
   injecting an appropriate signal for each of the one or more DSIPs, at a time based on a calculated delay for each of the one or more DSIPs; and
   performing a timing simulation for the SIPs.

12. The method of claim 1, wherein the functional waveform simulation data is based on one of register-transistor level (RTL) simulation and gate level simulation, and the DSIP is identified based on a stimulus mapping from a netlist, the method further comprising:
performing a name rectification on names between data based on different sources, using a similarity search based on a Siamese neural network, using nearest neighbor search (NNS).

13. The method of claim 12, further comprising:
identifying one or more mismatching names; and
at each iteration, one mismatching name is fed into the similarity search to find a corresponding corrected original name and selecting, for each mismatching signal name, the most similar candidate name as the corrected name.

14. The method of claim 12, wherein using the similarity search comprises one of:
traversing a design including string comparison to find a most similar signal;
encoding hierarchical names into vectors using locality sensitive hashing (LSH) and finding the most similar signal using nearest neighbor search (NNS);
performing a hierarchical tree search; and
utilizing or a nearest neighbor search (NNS) by locality sensitive hashing (LSH).

15. The method of claim 14, wherein the locality sensitive hashing (LSH) comprises one of:
distance-loss comprising a Siamese neural network with Distance-Loss Locality Sensitive Hashing; and
triplet-loss for similarity learning comprising a Nearest Neighbor Search with Triplet-Loss Locality Sensitive Hashing;
wherein both the distance-loss and the triplet loss learning apply supervised similarity learning to train and encode hierarchical names from strings into vectors using LSH, such that a distance in a metric space represents a similarity between hierarchical names.

16. A replay-based power analysis system to analyze a circuit, the system comprising:
a memory storing a netlist, a stimulus mapping file, and functional waveform simulation data;
a delay calculator to identify a total delay for a first signal for a delayed stimulus injection point (DSIP), the total delay being a time to propagate stimulus signals to the DSIP; and
a waveform replay simulator to analyze of a portion of the netlist, including injecting the first signal at the DSIP at a time based on the total delay for the DSIP, to calculate glitch power consumption in the circuit.

17. The system of claim 16, further comprising:
the delay calculator further configured to extract a delay path for each DSIP by tracing back from a clock pin to a stop point, wherein the stop point comprises one of: an input port of a target scope to be replayed, divider (DFF) output port, clock multiplexer output port, phase-locked loop (PLL) clock generator module output port, buffer output port, and an integrated clock gating (ICG) cell output port.

18. The system of claim 16, wherein:
the stimulus mapping file includes a set of selected stimulus injection points (SIPs) read from the netlist and associated mapped stimulus sources read from the waveform simulation data.

19. The system of claim 16, further comprising:
the waveform replay simulator further configured to perform a gate level waveform replay simulation of a portion of the circuit using the portion of the netlist, the waveform replay simulator configured to inject stimulus signals at each stimulus injection point for each DSIP, and utilizing an associated DSIP delay to determine the injected stimulus signals' propagation along a corresponding delay path, and further configured to generate a replay timing waveform database including detected glitches generated by the waveform replay simulator.

20. The system of claim 19, further comprising:
a power analysis tool configured to perform glitch power analysis using the glitches detected by the waveform replay simulator.

21. The system of claim 16, further comprising:
a hierarchical name rectification system to rectify signal names between the stimulus mapping file and the waveform simulation data, using a similarity search based on a Siamese neural network, using nearest neighbor search.

* * * * *